United States Patent [19]
Mizuno et al.

[11] Patent Number: 6,092,001
[45] Date of Patent: Jul. 18, 2000

[54] CONTROL METHOD AND APPARATUS OF LINE AND LINE SYSTEM

[75] Inventors: Yoshihiro Mizuno, Tokyo; Hitoshi Tsukasaki, Fujisawa; Keiro Yokoyama, Tokyo; Hiroshi Kawachi, Komae, all of Japan

[73] Assignee: Canon Kabushiki Kaisha, Tokyo, Japan

[21] Appl. No.: 08/851,709

[22] Filed: May 6, 1997

[30] Foreign Application Priority Data

May 20, 1996 [JP] Japan .................................. 8-116282
Apr. 11, 1997 [JP] Japan .................................. 9-094110

[51] Int. Cl.[7] .................................................. G06F 19/00
[52] U.S. Cl. ........................................... 700/116; 700/226
[58] Field of Search .............................. 364/132, 134, 364/178, 468.22, 468.23, 478.14; 711/122, 205; 712/14; 709/400, 428; 700/73, 115, 116, 226, 3, 5

[56] References Cited

U.S. PATENT DOCUMENTS

| | | | |
|---|---|---|---|
| 5,150,288 | 9/1992 | Imai et al. | 364/132 |
| 5,434,792 | 7/1995 | Saka et al. | 364/468.17 |
| 5,551,001 | 8/1996 | Cohen et al. | 711/122 |
| 5,555,504 | 9/1996 | Lepper et al. | 364/468.22 |
| 5,699,242 | 12/1997 | Togawa et al. | 364/134 |

FOREIGN PATENT DOCUMENTS

| | | |
|---|---|---|
| 0 156 921 A1 | 3/1985 | European Pat. Off. . |
| 0 620 512 A1 | 5/1994 | European Pat. Off. . |
| 7-271 424 | 10/1995 | Japan . |
| 2 073 460 | 10/1981 | United Kingdom . |

OTHER PUBLICATIONS

Terasawa et al., A performance evaluation of the multiprocessor testbed ATTEMPT–O, Parallel Computing, 701–730, Oct. 31, 1994.

"A new Approach for Process Control", Ocello et al., *IEEE*, p. 487–8 (1993).

"Universelle Ablaufsteuerung für die flexible Fertigung", Weck et al., *VDI–Z*, vol. 133, No. 3, pp. 50–56 (1991). English translation attached.

Primary Examiner—William Grant
Assistant Examiner—Chad Rapp
Attorney, Agent, or Firm—Fitzpatrick, Cella, Harper & Scinto

[57] ABSTRACT

A line system has control units each of which is connected to a processing device (a device for processing a workpiece, for example), and which are connected through a network. The system has a memory which stores data for use in processing the workpiece and which is provided for each control unit, and maintains the contents of the memories provided for the respective control units identical to each other.

16 Claims, 19 Drawing Sheets

FIG. 3A

| NO | BIT ADDRESS | NAME |
|---|---|---|
| 1 | B000—B04F | CONTROL UNIT 4-1 |
| 2 | B050—B09F | CONTROL UNIT 4-2 |
| 3 | B0A0—B0EF | CONTROL UNIT 4-3 |
| 4 | B0F0—B13F | CONTROL UNIT 4-4 |
| ⋮ | ⋮ | ⋮ |
| N | B1E0—B22F | CONTROL UNIT 4-n |
| ⋮ | ⋮ | ⋮ |
|  | B400—B42F | CONTROL UNIT 4-1 |
|  | B430—B45F | CONTROL UNIT 4-2 |
|  | B460—B48F | CONTROL UNIT 4-3 |
|  | B490—B4BF | CONTROL UNIT 4-4 |
|  | ⋮ | ⋮ |
|  | B520—B54F | CONTROL UNIT 4-n |
|  | ⋮ | ⋮ |

Rows 1–N: CHILD STATION WRITING AREA
Rows B400–B54F: PARENT STATION WRITING AREA

FIG. 3B

| NO | WORD ADDRESS | NAME |
|---|---|---|
| 1 | W000—W015 | CONTROL UNIT 4-1 |
| 2 | W030—W045 | CONTROL UNIT 4-2 |
| 3 | W046—W05B | CONTROL UNIT 4-3 |
| 4 | W05C—W071 | CONTROL UNIT 4-4 |
| ⋮ | ⋮ | ⋮ |
| N | W09C—W0B1 | CONTROL UNIT 4-n |
| ⋮ | ⋮ | ⋮ |
|  | W400—W415 | CONTROL UNIT 4-1 |
|  | W430—W445 | CONTROL UNIT 4-2 |
|  | W446—W45B | CONTROL UNIT 4-3 |
|  | W45C—W471 | CONTROL UNIT 4-4 |
|  | ⋮ | ⋮ |
|  | W49C—W4B1 | CONTROL UNIT 4-n |
|  | ⋮ | ⋮ |

Rows 1 through N: CHILD STATION WRITING AREA
Rows W400–W4B1: PARENT STATION WRITING AREA

FIG. 4

LINK BIT INFORMATION

| 5 | 4 | 3 | 2 | 1 | 0 | | |
|---|---|---|---|---|---|---|---|
| | MANUAL | AUTO | OFF-LINE | DEVICE | ON-LINE | B000 | OPERATION PANEL |
| | | | | DELIVERY | ACCEPTANCE | B010 | DEVICE CONDITION/ BOARD DELIVERY |
| | | | | | TRANSPORTABLE | B020 | RESET/PARENT STATION REPLY/INTERLOCK |
| OK2/NG2 | OK1/NG1 | BETWEEN LOT | DUMMY | MONITOR | PRODUCT | B030 | KIND OF BOARD |
| | | | | | PLC BATTERY RUNNING DOWN | B040 | TROUBLE WARNING |

| F | E | D | C | B | A | 9 | 8 | 7 | 6 |
|---|---|---|---|---|---|---|---|---|---|
| | | PRESENCE/ ABSENCE OF BOARD | OPERATION | WAITING 2 | WAITING 1 | A RESET | STOP | | |
| | | | | | DATA DELETION COMPLETION | TROUBLE | READING COMPLETION | | |
| | | | | | | | | | |
| | | | | | | | | | |
| | | | | | | | | | |
| | | | | | | | | | |

FIG. 5

LINK WORD INFORMATION

| Addr | Field | Size | Group |
|---|---|---|---|
| W000 | DELIVERY BOARD ID | (4W) | |
| W004 | ERROR 1 | (1W) | |
| | ERROR 2 | (1W) | |
| | ERROR 3 | (1W) | |
| | . . | | |
| | ERROR 6 | (1W) | |
| W00A | PROCESS DATA 1 | (2W) | SHEET DATA |
| W00C | PROCESS DATA 2 | (2W) | SHEET DATA |
| W00E | PROCESS DATA 3 | (2W) | SHEET DATA |
| W010 | PROCESS DATA 4 | (2W) | SHEET DATA |
| W012 | PROCESS DATA 5 | (2W) | SAMPLING DATA |
| W014 | PROCESS DATA 6 | (2W) | SAMPLING DATA |

FIG. 6

LINK BIT INFORMATION

| | 5 | 4 | 3 | 2 | 1 | 0 | |
|---|---|---|---|---|---|---|---|
| | | MANUAL | AUTO | OFF-LINE | DEVICE | ON-LINE | B050 | OPERATION PANEL |
| | | | | | DELIVERY | ACCEPTANCE | B060 | DEVICE CONDITION/ BOARD DELIVERY |
| | | | | | | TRANSPORTABLE | | RESET/PARENT STATION REPLY/INTERLOCK |
| | | | BETWEEN LOT | DUMMY | MONITOR | PRODUCT | B070 | KIND OF BOARD |
| | OK2/NG2 | OK1/NG1 | | | | PLC BATTERY RUNNING DOWN | B080 | |
| | | | | | | | B090 | TROUBLE WARNING |

| F | E | D | C | B | A | 9 | 8 | 7 | 6 |
|---|---|---|---|---|---|---|---|---|---|
| | | PRESENCE/ ABSENCE OF BOARD | OPERATION | WAITING 2 | WAITING 1 | A RESET | STOP | | |
| | | | | | | TROUBLE | | | |
| | | | | | DATA DELETION COMPLETION | | READING COMPLETION | | |
| | | | | | | | | | |
| | | | | | | | | | |

FIG. 7

LINK WORD INFORMATION

| | | |
|---|---|---|
| W030 | DELIVERY BOARD ID | (4W) |
| W034 | ERROR 1 | (1W) |
| | ERROR 2 | (1W) |
| | ERROR 3 | (1W) |
| | . | |
| | . | |
| | ERROR 6 | (1W) |
| W03A | PROCESS DATA 1 | (2W) |
| W03C | PROCESS DATA 2 | (2W) |
| W03E | PROCESS DATA 3 | (2W) |
| W040 | PROCESS DATA 4 | (2W) |
| W042 | PROCESS DATA 5 | (2W) |
| W044 | PROCESS DATA 6 | (2W) |

FIG. 8

BASE ADDRESS: B400H

| | 5 | 4 | 3 | 2 | 1 | 0 | | |
|---|---|---|---|---|---|---|---|---|
| | | | | T RESET | READING COMPLETION | A RESET | B400 | ERROR |
| | | | | | | INPUTABLE | B410 | CASSETTE & BOARD INFORMATION |
| | | | | | | | B420 | RESET |

| F | E | D | C | B | A | 9 | 8 | 7 | 6 |
|---|---|---|---|---|---|---|---|---|---|
| | | | | | | | | | |
| | | | | | | | | | |
| | | | | | | | | | |

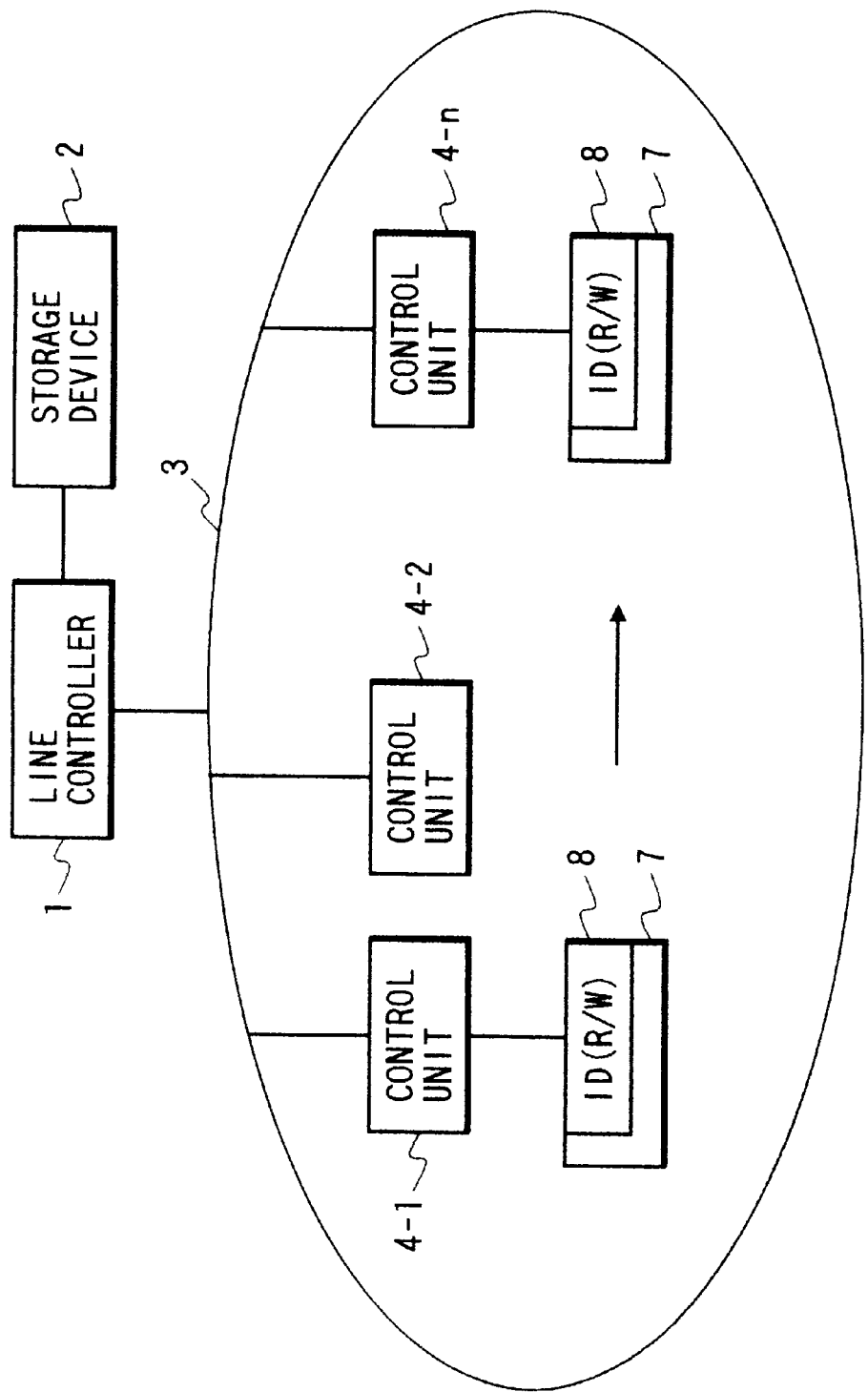

FIG. 16

| ITEM | CONTENTS |
|---|---|
| CASSETTE ID | CST001 |
| CASSETTE EMPTY/MOUNTING CLASSIFICATION | MOUNTING |
| PRODUCT LOT NO | LOT A |
| LOT DIVISION CLASSIFICATION | NONE |
| PRODUCT KIND CODE | 4 |
| COMPLETED PROCESS NUMBER | 2 |
| NEXT PROCESS NUMBER | 3 |
| DATE OF PROCESS | 94/11/25 |
| TIME OF DELIVERY FROM PROCESS | 9:15 |
| NUMBER OF USE OF CASSETTE | 3 |
| CASSETTE CLASSIFICATION | 4 |
| NUMBER OF CONTAINED BOARDS | N |
| NUMBER OF INPUT STARTING STEP | 1 |
| BOARD 1 ID | KIBAN001 |
| BOARD 1A QUALITY | GOOD |
| BOARD 1B QUALITY | GOOD |
| BOARD 2 ID | KIBAN002 |
| BOARD 2A QUALITY | GOOD |
| BOARD 2B QUALITY | GOOD |
| . | . |
| . | . |
| . | . |
| BOARD (N-1) ID | KIBANN-1 |
| BOARD (N-1) A QUALITY | GOOD |
| BOARD (N-1) B QUALITY | GOOD |
| BOARD (N) ID | KIBAN N |
| BOARD (N) A QUALITY | GOOD |
| BOARD (N) B QUALITY | GOOD |

CONTROL METHOD AND APPARATUS OF LINE AND LINE SYSTEM

BACKGROUND OF THE INVENTION

1. Field of the Invention

The invention relates to a line and a line system, and to a control method therefor, in which, for example, work is processed and is sequentially transported to any steps downstream of the processing.

2. Related Background Art

A construction of a conventional manufacturing line system will now be described with reference to FIG. 18.

A processing device unit 111 and a transport device unit 112 of a station 101 are managed by a first line controller PLC1. Similarly, a processing device unit 121 and a transport device unit 122 of a station 102 are managed by a second line controller PLC2, and a processing device unit 131 and a transport device unit 132 of a station 103 are managed by a third line controller PLC3. The first, second, and third line controllers PLC1, PLC2, and PLC3 are connected to a host computer 150 through corresponding communication lines K1 to K3, respectively. The host computer 150 collects and manages tracking data and quality data of each job or each unit or batch of work at certain timings through the first, second, and third line controllers PLC1, PLC2, and PLC3, respectively. The host computer 150 supplies the tracking data of the work to the respective equipment via the first, second, and third line controllers PLC1, PLC2, and PLC3 in accordance with a transporting state of the work (i.e., where it is), respectively.

In such conventional system construction, as the number of devices and equipment to be managed increases, higher processing ability is required for the host computer 150. The frequency of communication executed between the host computer 150 and each line controller also increases. Moreover, when the cycle time for each step of work is short, it is very difficult for the host computer 150 to manage the work step by step. Since collection of the tracking data, starting of working of the equipment, and completion signals are all responsibilities of the host computer 150, in order to preferentially transmit information, a dedicated line or the like is necessary between the host computer 150 and each line controller, and associated processing is also fairly troublesome.

SUMMARY OF THE INVENTION

The invention is made in consideration of the above conventional example, and it is an object of the invention to provide a line and a line system, and a control method therefor, in which control units connected to processing devices are synchronized by using a memory.

Another object of the invention is to provide a line and a line system, and a control method therefor, in which, while sharing information regarding work to be processed among a plurality of control units, processes in processing devices are synchronized, and the work can be processed by an apparatus having a simple construction.

To accomplish the above objects, according to an embodiment of the invention, there is provided a line system in which control units, each of which is connected to a processing device of a work, are connected through a network, comprising a memory which has data for use in processing the work and is provided for each control unit, and uniforming means, for maintaining the contents in the memories provided in the respective control units identical to each other.

According to another aspect of the invention, there is provided a line control apparatus in which control units, each of which is connected to a processing device, are connected through a network. The apparatus comprises a memory for storing, for every control unit, data which is inputted from each control unit and is used in processing the work. Transmitting means transmits the data of one set to each relevant control unit. That set is composed of the data which was stored in the memory and is the data of the control units which are connected to at least the processing devices that are arranged before and after a processing line of the work.

According to still another aspect of the invention, there is provided a line control method in a line in which control units, each connected to a respective processing device for processing a workpiece, are connected by a network, comprising the steps of: storing data regarding the processing devices connected to the control unit into a memory of the control unit in question; sampling contents in the memory provided for each control unit at predetermined time intervals and storing thereunto; and transmitting a set of data to each relevant control unit, wherein each of the sets is composed of the data of the control units connected to at least the processing devices which are arranged before and after the processing line where the work in question is being processed, and the data is stored in every control unit.

The above and other objects and features of the present invention will become more fully apparent from the following detailed description and the appended claims with reference to the accompanying drawings.

BRIEF DESCRIPTION OF THE DRAWINGS

FIGS. 3A and 3B are diagrams showing data structures in a common memory, in which FIG. 3A shows an area to store the data on a bit unit basis and FIG. 3B shows an area to store the data on a word unit basis;

FIG. 4 is a diagram for explaining link bit information which is managed by a control unit (PLC) 4-1 according to the first embodiment;

FIG. 5 is a diagram for explaining link word information which is managed by the control unit (PLC) 4-1 according to the first embodiment;

FIG. 6 is a diagram for explaining link bit information which is managed by a control unit (PLC) 4-2 according to the first embodiment;

FIG. 7 is a diagram for explaining link word information which is managed by the control unit (PLC) 4-2 according to the first embodiment;

FIG. 8 is a diagram for explaining link bit information which is managed by a line controller according to the first embodiment;

FIG. 15 is a block diagram showing a construction of a manufacturing line system according to a second embodiment of the invention;

FIG. 16 is a diagram for explaining ID tag information according to the second embodiment;

DETAILED DESCRIPTION OF THE PREFERRED EMBODIMENTS

The preferred embodiments of the invention will now be described in detail hereinbelow with reference to the drawings. In the embodiments, a tracking control method in a manufacturing line will be described.

Figure 1:
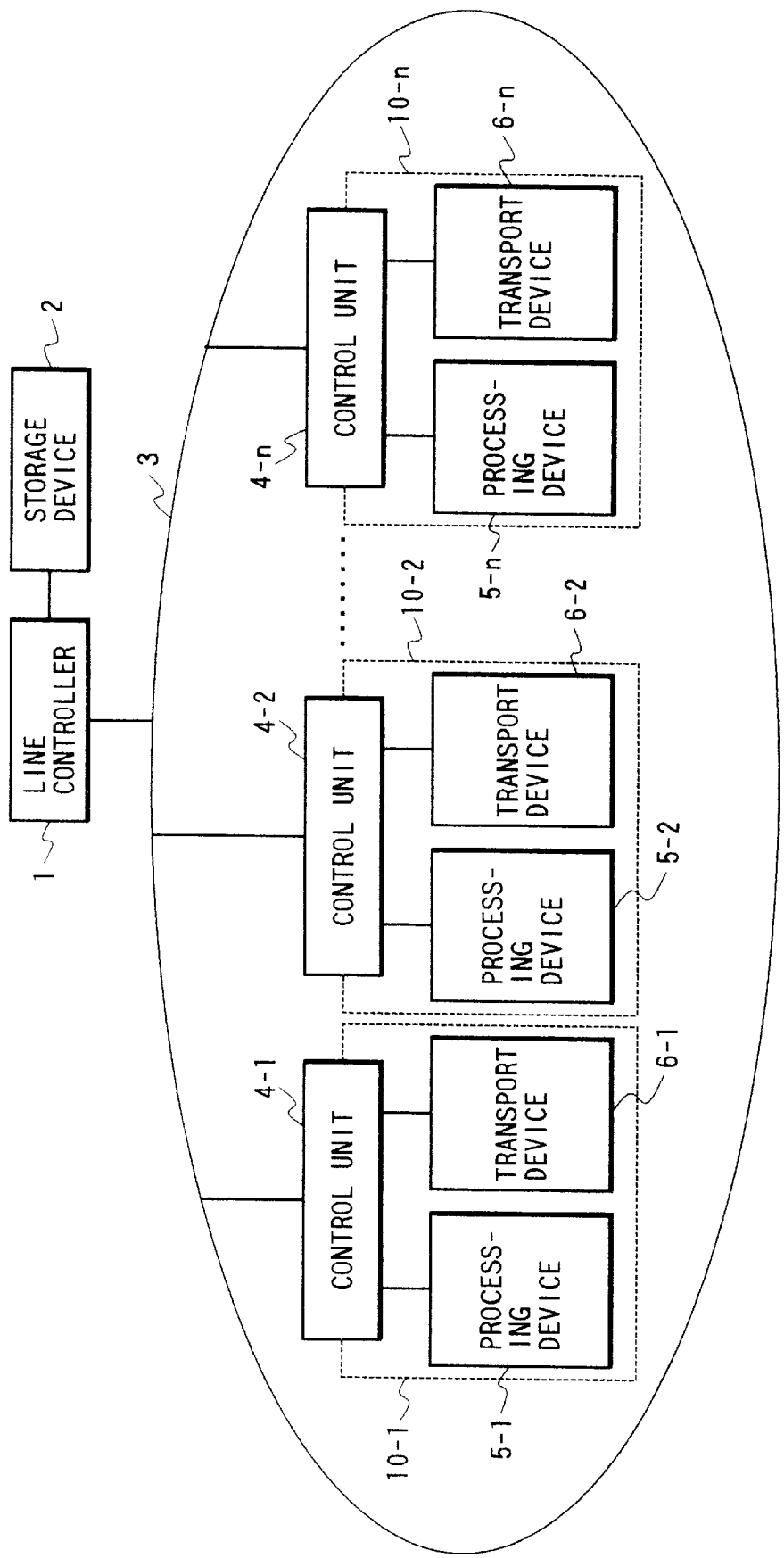
FIG. 1 is a block diagram showing a construction of a manufacturing line system according to a first embodiment of the invention.

FIG. 1 is a block diagram showing the construction of a manufacturing line system according to the first embodiment of the invention.

In the manufacturing line system of FIG. 1, a line controller 1 and station control units (PLC) 4 (4-1, 4-2, ..., 4-n) are connected by a sequencer network 3. Reference numeral 2 denotes a storage device such as a hard disk or the like connected to the line controller 1. Each station 10 (10-1, 10-2, ..., 10-n) has a processing device (5-1, 5-2, ..., 5-n) for processing work, a transport device 6 (6-1, 6-2, ..., 6-n) to transport the work to the next station, and the like.

The sequencer network 3 is based on a common memory system of a ring type which has been frequently used hitherto. The sequencer network 3 can write data from each station control unit 4 connected to the network 3 into a specified area in a common memory of its own control unit, can read all areas in the common memories of the other control units, and can write and read data into/from the specified area in the common memory of each control unit even by the line controller 1 serving as a parent station (master station)(i.e., line controller 1 can also write and read data to/from a specified area in a common memory of each control unit). As the network 3, a bus type connection network can also be used so long as it is based on a common memory system.

Figure 2:
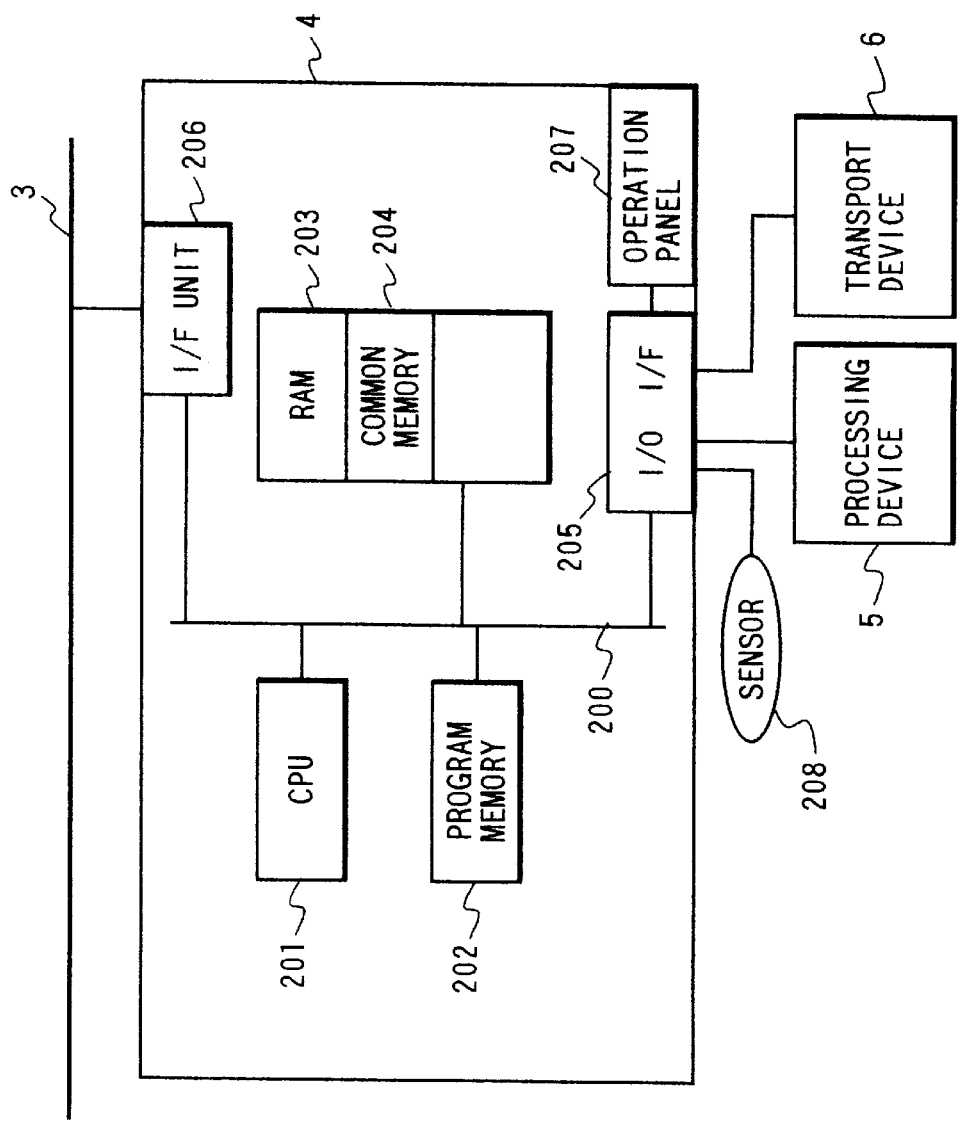
FIG. 2 is a block diagram showing a construction of a control unit which is used in a network according to the first embodiment.

FIG. 2 is a block diagram showing the construction of the control unit 4 according to the first embodiment. It is assumed that the control units 4-1 to 4-n in FIG. 1 have the same construction.

In FIG. 2, reference numeral 201 denotes a CPU such as a microprocessor or the like to control the whole control unit 4, and 202 indicates a program memory in which a control program that is executed by the CPU 201 has been stored. The program memory 202 is ordinarily constructed of a ROM. Reference numeral 203 denotes a RAM having a common memory area 204 which is used as a work area to store various data at the time of execution of various controls by the CPU 201 and can also be accessed from the other control units through the network 3 and a line interface (I/F unit) 206. Reference numeral 205 denotes an input/output interface unit (I/O●I/F). The processing device 5 and transport device 6 are connected through the I/O●I/F 205, and their operations are controlled by the CPU 201. Reference numeral 207 denotes an operation panel. Various key switches which are operated by the operator, an LED, a display, and the like are arranged on the operation panel 207. Reference numeral 208 denotes a sensor which is connected to the control unit 4 through the I/O●I/F 205 and detects the position and the state of the work currently being processed in the processing device 5 and transport device 6 and generates a corresponding signal. The sensor 208 includes a positioning and delivery sensor 902 of a board and an acceptance sensor 903, which will be explained hereinbelow. The processing device 5 has a buffer for receiving and temporarily holding the work from the transport device 6 and for temporarily holding the processed work before it is delivered to the transport device 6. The foregoing component elements are connected to a bus 200. In the above construction, although the CPU 201, program memory 202, and RAM 203 are connected to the bus 200, they can be also constructed as a one-chip IC.

As a common memory area (hereinafter referred to as a "common memory") 204, each station control unit 4 connected to the network 3 has an area for storing data on a word (16 bits) unit basis and an area for storing data on a bit (1 bit) unit basis in order to transmit and receive information to/from the other station control units. Each control unit further has an internal register to store and hold tracking data.

A data structure in the common memory 204 will now be described in detail. FIGS. 3A and 3B show the data structures in the common memory 204. FIG. 3A shows the area (hereinafter, referred to as a "bit map") for storing data on a bit unit basis. FIG. 3B shows the area (hereinafter, referred to as a "word map") for storing data on a word unit basis.

The bit map and the word map each store information of each of the control units 4-1 to 4-n serving as child stations, and information which is transmitted from the line controller 1 serving as a parent station to each of the control units 4-1 to 4-n. The line controller 1 and control units 4-1 to 4-n also have common memories 204, in which the common data has been stored. Therefore, the data formats in the common memories 204 in the line controller 1 and control units 4-1 to 4-n are the same, and the address of each datum is shifted in the same memory space by an amount of an address corresponding to a base address and is allocated to every station. A specific example of the data stored will now be described.

FIGS. 4 and 5 are diagrams showing specific data structures of the control unit 4-1 of the common memory 204 according to the first embodiment. FIG. 4 shows the data structure of link bit information in which data has been stored on a bit unit basis. FIG. 5 shows the data structure of link word information in which data has been stored on a word unit basis.

In the control unit 4-1, base addresses ("W000H" and "B000H") are allocated as shown in FIGS. 4 and 5. "H" indicates a hexadecimal number.

For example, as shown in FIG. 4, in the control unit 4-1, "auto" in operation panel information is provided at the third bit from address "B000H" in the common memory 204, and thus the address of "auto" is set to "B003H". As shown in FIG. 5, "delivery board ID" of the link word information is stored in addresses "W000H" to "W003H" in the common memory 204.

FIGS. 6 and 7 are diagrams showing the data structure of the control unit 4-2 in the common memory 204. In the control unit 4-2, a base address in the data area of the word unit is set to "W030H" and a base address in the bit unit area is allocated to "B050H", so that it will be understood that their data structures are quite the same.

Further, FIG. 8 is a diagram showing the construction of a data area of a bit unit for the control unit 4-1 of the line controller (parent station) 1 in the common memory 204.

When referring to the data format of FIG. 8, a base address is set to "B400H".

Figure 9:
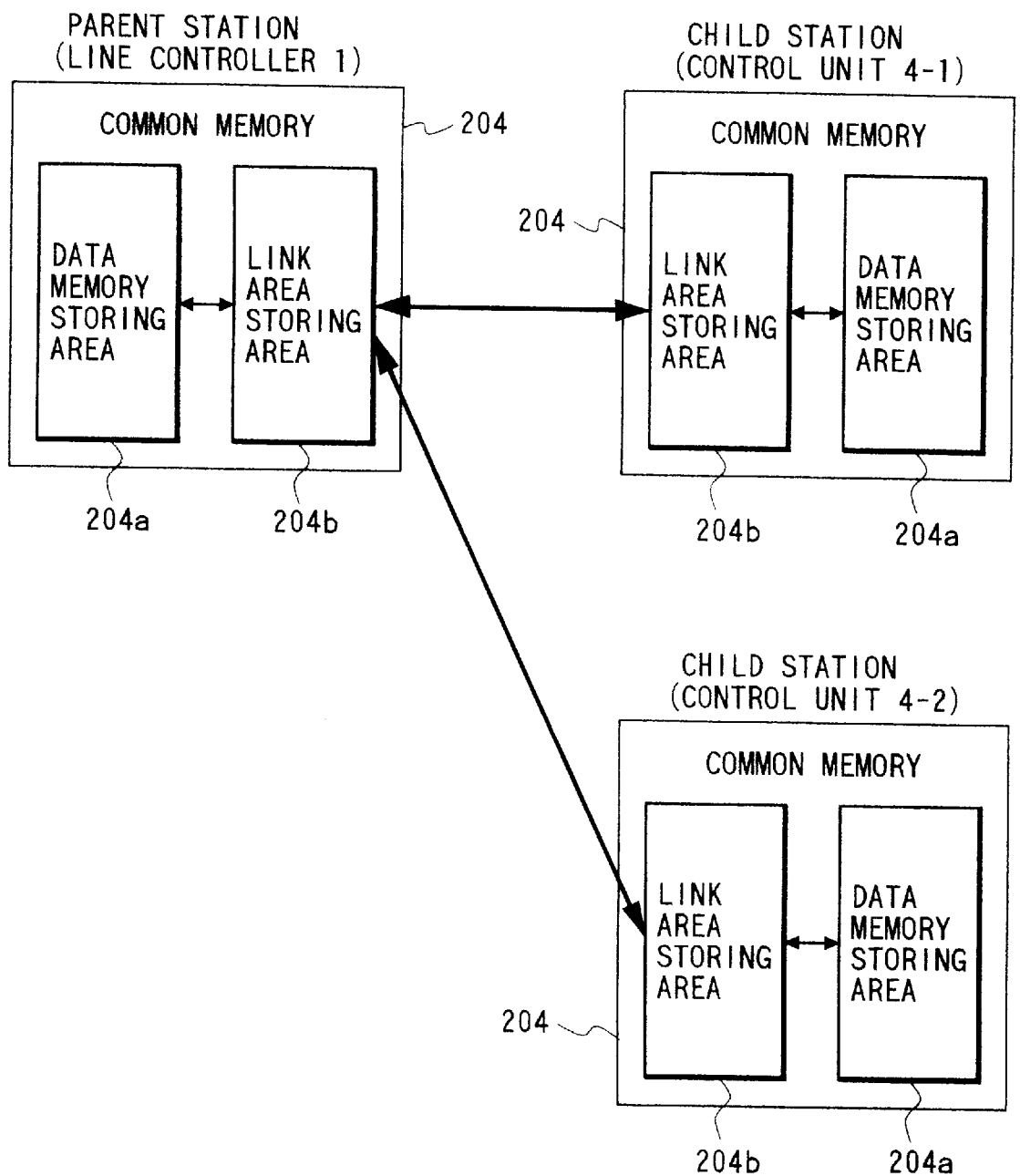
FIG. 9 is a diagram showing a refreshing process of the data in the common memory.

The refreshing operation of the data in the common memory 204 mentioned above will now be described with reference to FIG. 9.

Each common memory 204 has a data memory storing area 204a and a link area storing area 204b, and those areas have the same data structures as those shown in FIGS. 3A and 3B. The data memory storing area 204a is a storing area for data for use in operation control in each station. The link area storing area 204b is provided to make the contents in the data memory storing area 204a of each control unit coincide, without exerting an influence on each operation control (i.e., each station performs processing using data stored in area 204a, and area 204b does not influence operation control of the station).

In child stations, that is, in the control units 4-1 to 4-n, when there is a change in a state in each station, portions in the relevant addresses of the corresponding self control unit are rewritten in the data memory storing area 204a. When considering the control unit 4-1, in the data regarding the changed state in the station 10-1, the portions in the relevant addresses of B000H to B04FH regarding the control unit 4-1 are rewritten.

The data memory storing area 204a is refreshed as follows. First, the data stored in the link area storing area 204b is transmitted to the data memory storing area 204a, and the data on the data memory storing area 204a side, excluding the data about the particular control unit 4 under discussion, is overwritten. That is, in the control unit 4-1, the data in the data memory storing area 204a is overwritten by the data stored in the link area storing area 204b, excluding the portions of B000H to B04FH that relate to the control unit 4-1. On the other hand, with respect to the portions B000H to B04FH that relate to the control unit 4-1, the data stored on the link area storing area 204b is overwritten by the data in the data memory storing area 204a. When the processing for all addresses is finished, the data in the data memory storing area 204a is refreshed. After that, the refreshed data is returned to the link area storing area 204b, and now the data in the data memory storing area 204a and the data in the link area storing area 204b coincide.

Although the above description has been made with reference to the control unit 4 of the child station, the above processes are also similarly performed with respect to the data refreshing operation in the line controller 1 serving as a parent station.

The above description has been made with respect to the refreshing operation of the data in one common memory 204. A data refreshing process between the control units will now be described.

First, the line controller 1 reads out the data regarding each control unit 4 from the control unit 4. Specifically speaking, the line controller 1 reads out the data from each link area storing area 204b. The data in the link area storing area 204b of the line controller 1 is rewritten by the read-out data.

The rewritten data in the link area storing area 204b of the line controller 1 is transmitted to the control units 4-1 to 4-n serving as child stations. The data in the link area storing area 204b in each of the control units 4-1 to 4-n is rewritten, so that the data in the line controller 1 and the data in the common memories 204 in the control units 4-1 to 4-n are held to the same values. Therefore, since each control unit 4 can know the states of the other stations from its own common memory 204, there is no need to transmit and receive data between the control units at the time of each operation control.

In the above example, the contents in the memories provided for all control units which are connected to the line are shared by all of the control units. However, if the work can be processed by the data of only the processing devices arranged immediately before and after the device in question, as for the control units with such a relation, it is sufficient to share the data possessed by the control units of just those processing devices.

Figure 10:
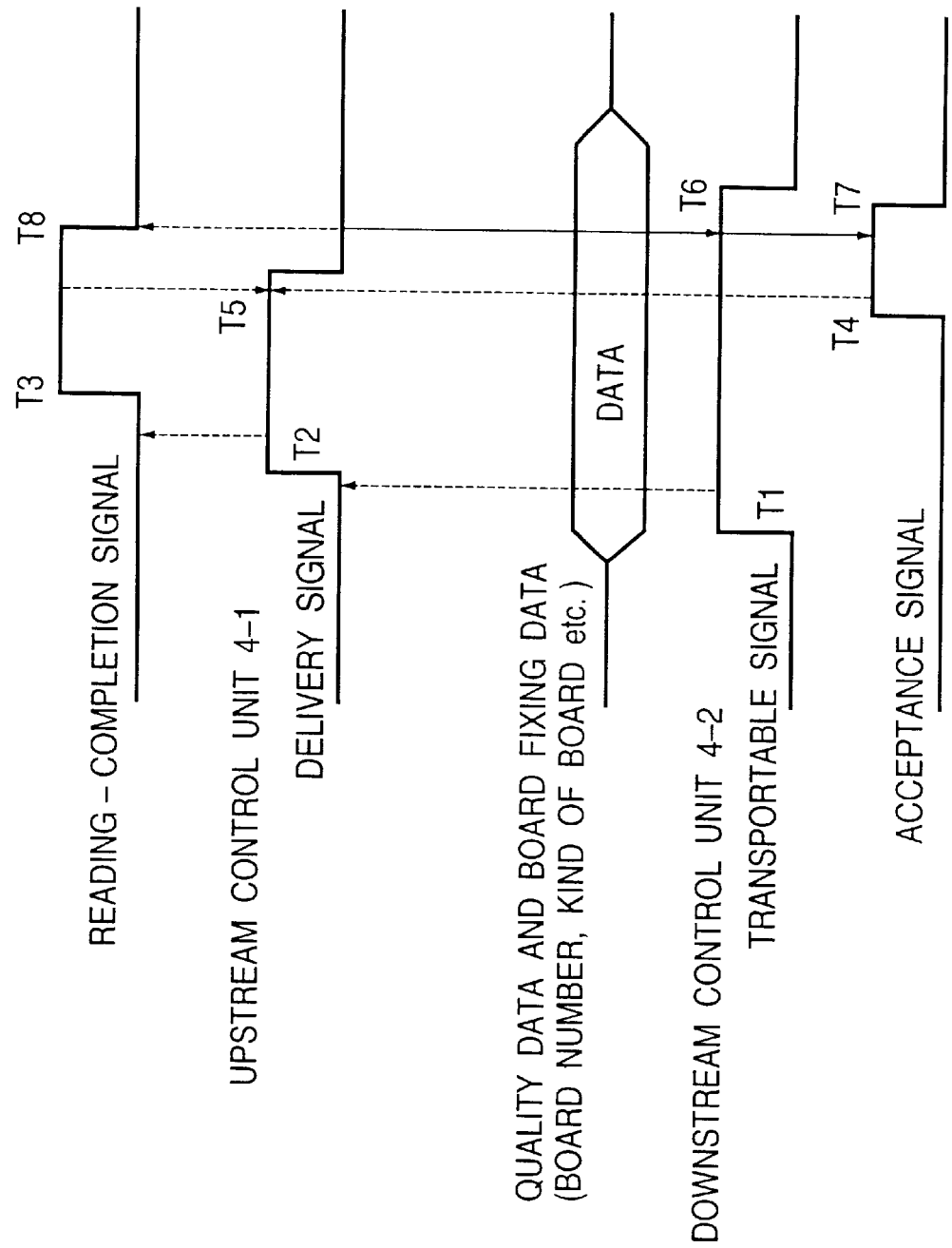
FIG. 10 is a timing chart for explaining transmission and reception of data between the control unit and the line controller according to the first embodiment.
Figure 11A:
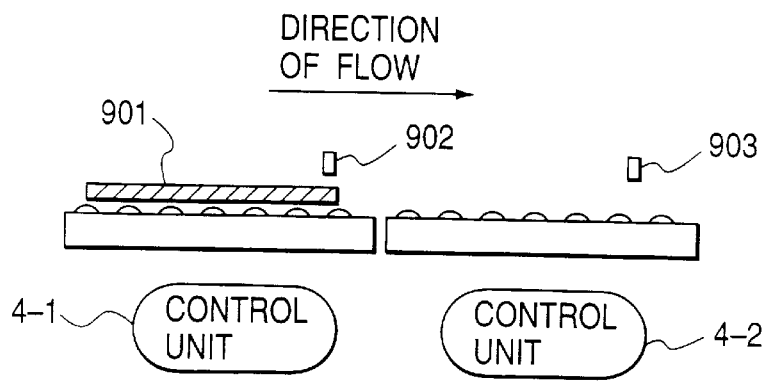
FIGS. 11A, 11B and 11C are diagrams for explaining a transportation of a board between the control units 4-1 and 4-2 according to the first embodiment.
Figure 11B:
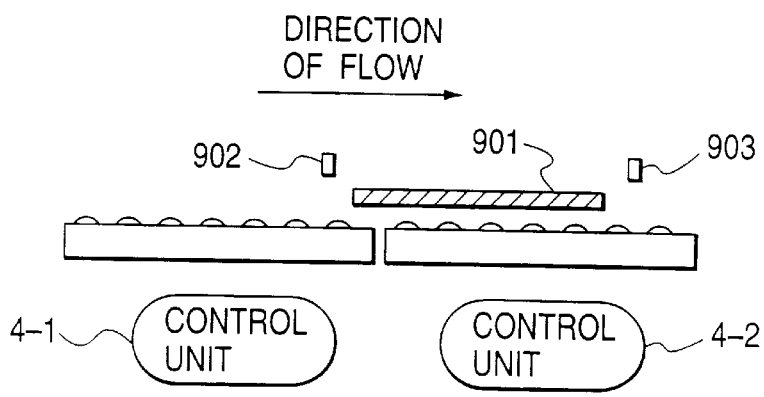
Figure 11C:
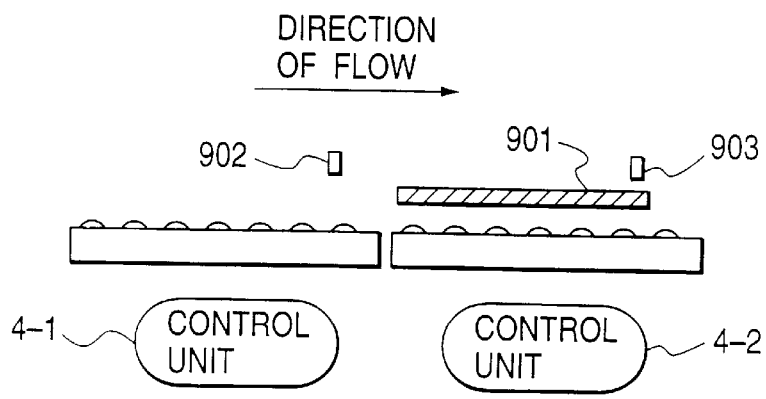

A procedure for signal transmission and reception between the control units using the link information as mentioned above will now be described with reference to the timing chart of FIG. 10 and diagrams of FIGS. 11A to 11C showing the movement of a board 901 between the control units 4-1 and 4-2.

First, at the beginning of the sequence, quality data and peculiar data of the board are outputted to the network 3 and are stored into predetermined addresses in the common memory 204 which is managed by each control unit. Thus, information regarding board quality (temperature and humidity, etc., in processing of the board) which has been processed by the processing device 5 and is sequentially transported to the next station by the transport device 6 is stored into, for example, an area of 12 words in a range from address "W00AH" to address "W015H" in the control unit 4-1. ID information such as a board number or the like is stored into four words from address "W000H". Further, bit information indicative of the kind (product, monitor, dummy, between lots, etc.) of board is stored into an area from address "B030H" to "B035H". Similarly, even in the other control units, those data are stored from the base address corresponding to each unit of the common memory 204.

As shown in FIG. 11A, in a state in which the board 901 is in the station managed by control unit 4-1, control unit 4-2 sets a "transportable" signal (address "B070H") indicating that the board 901 can be received at timing T1 (see FIG. 10). Control unit 4-1 writes sampling data relating to the board 901 under processing in processing device 5-1 into the common memory 204 (at addresses, in the preferred embodiment W012H to W015H) at any time, and finishes the processing in processing device 5-1. Once the board 901 is ready to be delivered, the board ID of the board 901 is written into W000H to W003H, sheet processing quality information is written into W00AH to W011H, and further, the board-kind information is set into B030H to B035H. After that, a transporting motor of transport device 6-1, for delivery and the like, is driven, thereby starting the delivery of the board 901.

As shown in FIG. 11B, when the board 901 is no longer detected by the positioning and delivery sensor 902 of control unit 4-1, and the completion of the delivery of the board 901 is detected, control unit 4-1 sets a "delivery" signal (a bit in address B011H) of the apparatus state/board transfer and reception at timing T2, thereby recording that the delivery of the board 901 is completed.

The line controller 1 collects the data at a preset sampling time from the control units 4-1 to 4-n. For example, if the sampling time is set to one minute, after the board 901 has entered the processing device 5-1 managed by control unit 4-1 for the first time, the line controller 1 samples the data one minute later.

The line controller 1 fetches the board ID (W000H to W003H), processing quality information (W00AH to W014H), and board-kind information (B030H to B035H) when the "delivery" signal of control unit 4-1 is set and sets a "reading-completion" signal (the bit in address B411H) at a time corresponding to the completion of the collection of those data (timing T3).

At next timing T4, when the acceptance of the board 901 by the acceptance sensor 903 (see FIG. 11C) is detected, control unit 4-2 fetches the board ID (W000H to W003H) and board-kind information (B030H to B035H). After that, the acceptance signal (a bit in address B061H) is set, thereby informing control unit 4-1 that transportation has been completed. Timing T5 now follows, and when the "acceptance" signal from control unit 4-2 is set and it is confirmed that the reading operation of the line controller 1 has been completed, namely, when it is confirmed that the transportation of the board 901 and the fetching of the quality information of the line controller 1 are finished, control unit 4-1 resets the "delivery" signal (address B0011H).

At timing T6, control unit 4-2 resets the "transportable" signal (the bit in address B070H) when the "delivery" signal of control unit 4-1 is reset. Control unit 4-2 resets the "acceptance" signal (the bit in address B061H) at timing T7. When it is confirmed, at timing T8, that the "delivery" signal of control unit 4-1 has been reset, the line controller 1 resets the "reading-completion" signal.

Figure 12:
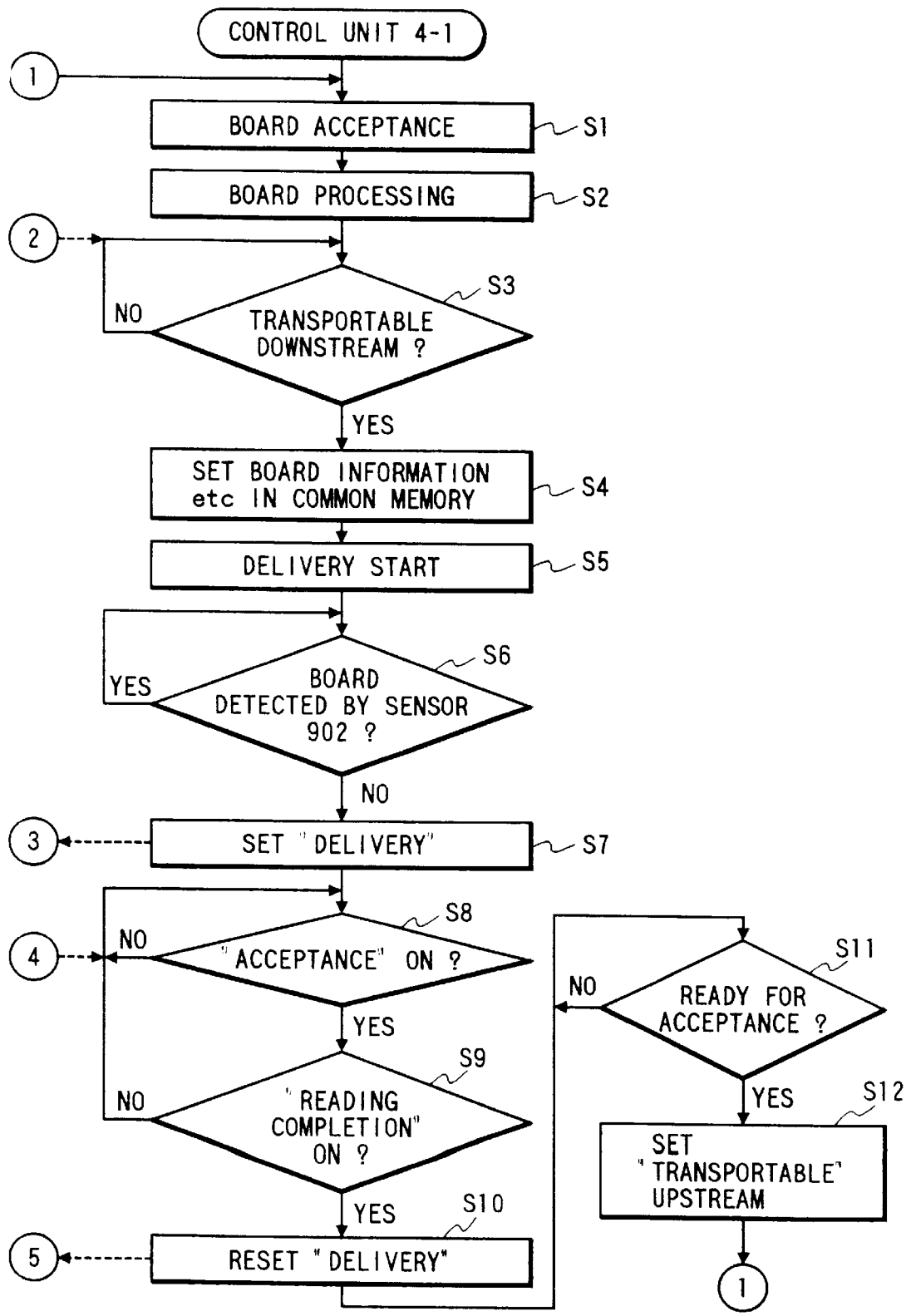
FIG. 12 is a flowchart showing processes in the control unit 4-1 according to the first embodiment.

FIG. 12 is a flowchart showing processing by control unit 4-1 according to embodiment 1.

First, in step S1, the board 901, that is, the object of processing, is received. In step S2, the board 901 is processed by processing device 5-1. In step S3, in the control unit 4-2 on the downstream side, a check is made to see if the "transportable" signal has been set in address B070H in the common memory 204. If YES, the processing routine advances from step S3 to step S4, and the sampling data regarding the board during the processing or after completion of the processing is written into addresses W012H to W015H in the common memory 204. The processing is finished. If the board is ready to be delivered, the board ID of the board 901 to be delivered is written into addresses W000H to W003H, the sheet processing quality information is stored into addresses W00AH to W011H, and the board-kind information is stored into addresses B030H to B035H.

The processing routine advances to step S5. A transporting motor of transport device 6-1 is driven, and the transportation of the board 901 is started. Once the board 901 is no longer detected by the sensor 902 in step S6 (e.g., after the board 901 has been delivered), step S7 follows. The "delivery" signal in address B011H in the common memory 204 is set, thereby informing the control unit 4-2 on the downstream side that the delivery of the board has been completed.

In step S8, the "acceptance" signal is set by the control unit 4-2 on the downstream side. When the "reading-completion" signal of the line controller 1 is set in step S9, step S10 follows, and the "delivery" signal set in step S7 is reset. Step S11 follows, and a check is made to see if a preparation for reception of the next board 901 to be processed has been completed. If YES, step S12 follows, and the "transportable" signal is set, thereby informing the control unit 4-1 on the upstream side that the preparation is complete. When the next board is inserted and conveyed from the upstream side, the processes from step S1 are repetitively executed.

Figure 13:
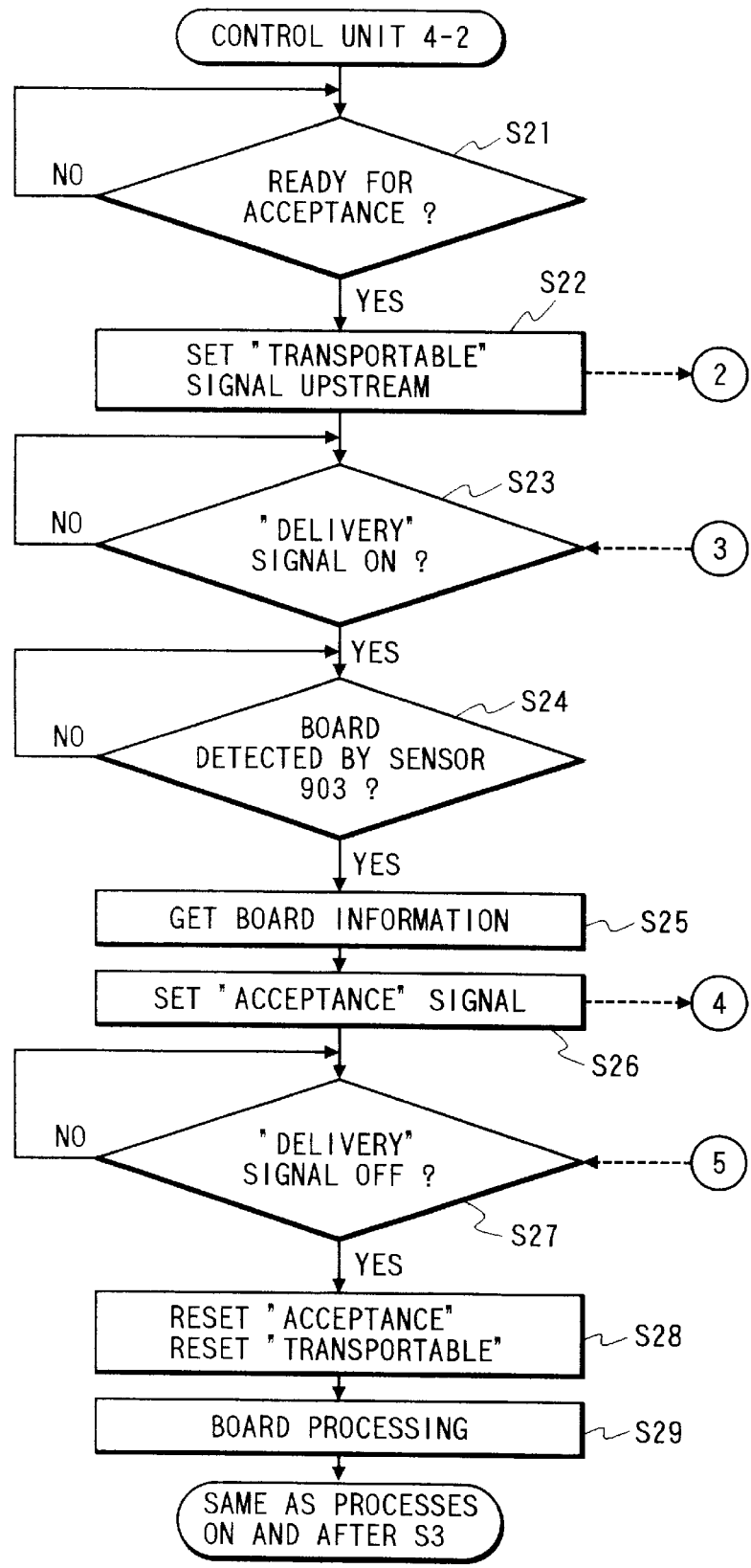
FIG. 13 is a flowchart showing processes in the control unit 4-2 according to the first embodiment.

FIG. 13 is a flowchart showing processes by the control unit 4-2 located on the downstream side of the control unit 4-1.

First, in step S21, a check is made to see if the preparation for reception of the board 901 has been completed. If YES, step S22 follows, and the "transportable" signal (the bit in address B070H) is set, thereby informing the control unit 4-1 on the upstream side of the completion of the preparation. In control unit 4-1, thus, the processing routine advances from step S3 to step S4 in FIG. 12.

The delivery of the board in the control unit 4-1 on the upstream side is then started. When the "delivery" signal (the bit in address B0111H) in control unit 4-1 is set (step S7 in FIG. 12), step S24 follows. A check is made by the sensor 903 in step S24 to see if the board 901 has arrived. When the acceptance of the board 901 is detected by the sensor 903, step S25 follows. The board ID (W000H to W003H) and the board-kind information (B030H to B035H) stored in the common memory 204 of the control unit 4-1 are fetched. After that, step S26 follows, and the "acceptance" signal (the bit in address B061H) is set, thereby informing control unit 4-1 that the conveyance has been completed. Thus, the processing routine in control unit 4-1 advances from step S8 in FIG. 12 to step S9.

The processing routine subsequently advances to step S27, the "delivery" signal (the bit in address B061H) is reset. In step S28, the "acceptance" signal in address B061H and the "transportable" signal in address B070H are reset. Step S29 follows, and the conveyed board is processed. Subsequent processing is similar to those in step S3 and subsequent steps in FIG. 12, described above.

Figure 14:
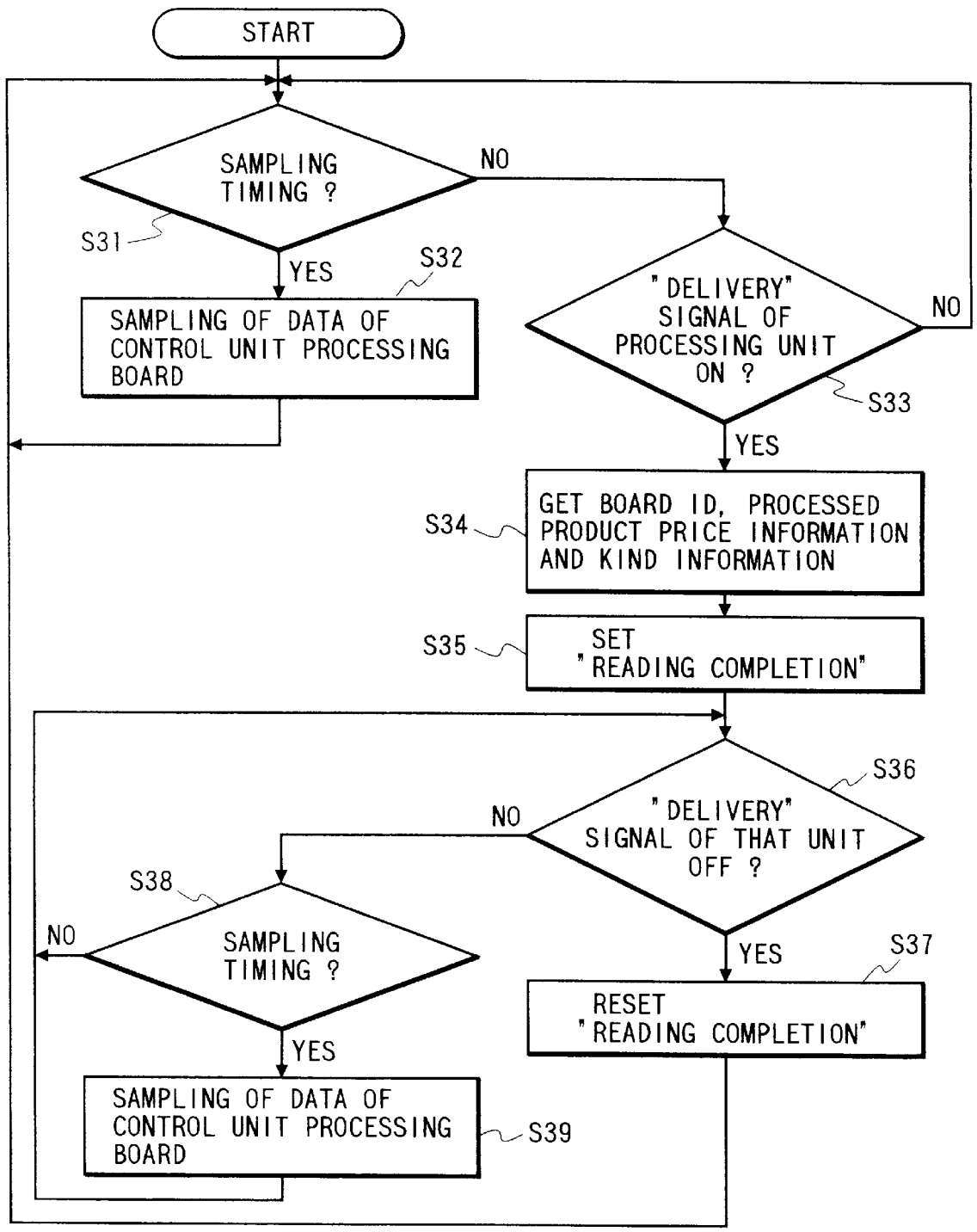
FIG. 14 is a flowchart showing processes in the line controller according to the first embodiment.

FIG. 14 is a flowchart showing processes by the line controller 1 of embodiment 1.

The line controller 1 reads out the data from the common memory 204 of the control unit which is processing the board 901 and samples the read-out data at a predetermined sampling timing (steps S31 and S32). At timings other than the preset sampling timings, the processing routine advances from step S31 to step S33. A check is made to see if the "delivery" signal (the bit in address BXX1H: XX can be any of "01", "06", "B", "10", "15", and the like) of the control unit which is processing the board has been set. If YES, step S34 follows, and the board ID (W000H to W003H), processing quality information (W00AH to W014H), and board-kind information (B030H to B035H) are fetched from the common memory 204. When the collection of those data is completed, step S35 follows, and the "reading-completion" signal (the bit in address B411H) is set.

Step S36 follows, and a check is made to see if the "delivery" signal of the control unit (for instance, control unit 4-1) is OFF. If NO, step S38 follows, and a check is made to see if it is time for a sampling, in a manner similar to steps S31 and S32. When the sampling timing of the data stored in the common memory 204 comes, step S39 follows, and the data from the control unit which is processing the board is collected. When the "delivery" signal is reset in step S36, step S37 follows, and the "reading-completion" signal (the bit in address B411H) is reset, thereby notifying each control unit that the reading of various data of the common memory 204 has been completed. Thus, for example, as shown in the flowchart of FIG. 12, the processing routine advances from step S9 to step S10, and the "delivery" signal of the control unit in question is reset.

A selecting-and-housing process for use when a defect occurs in one step or another (for example, an inspecting step or the like) during the processing in the line will now be described.

For example, when a defect occurs in the step in the control unit 4-1, its career is stored into a register of the CPU 201. Quality information (a bit in address B034H or B035H) of the board shown in FIG. 4 is set to "NG" (the bit is set) at the time of the delivery of the board. This information is tracked to the control unit on the downstream side in accordance with the procedure of the flowchart mentioned above.

For example, now assuming that two boards are taken out, when one side is defective, the quality information of the relevant board is rewritten to "NG" (for example, the board information relating to the head side is set to B034H and the board information relating to the rear side is set to B035H). In the case of taking out a number of boards, the invention operates similarly, writing the quality information of each board into the relevant area in addresses B036H to B03FH.

The information regarding the quality of the board which is generated in the line as mentioned above is stored as board information in the control unit of each station, the board and the board information are tracked, and these processes are sequentially executed as needed. In the final step, on the basis of the board ID, board information, and the like of the board which was tracked, good products (boards) and defective products are discriminated, and can for example be enclosed into different cassettes or the like. The information stored in the memory including those pieces of information effectively functions with respect to the management for ISO9000 or ISO14000. In the line controller 1, since the same contents as in each control unit 4 have been also stored in the common memory, it is also possible to easily perform the management regarding ISO9000 or ISO14000.

The second embodiment of the invention will now be described.

FIG. 15 is a diagram showing a construction of a manufacturing line system according to the second embodiment of the invention. Portions common to this embodiment and the foregoing first embodiment are designated by the same reference numerals, and their descriptions are omitted.

In FIG. 15, reference numeral 7 denotes a cassette enclosing a plurality of boards. The cassette 7 has a readable/writable ID tag 8 in which information shown in FIG. 16 has been stored.

As shown in FIG. 16, the ID tag 8 has "cassette ID", "cassette empty/mounting classification" indicating whether the cassette is empty or a board has been mounted, "product lot No.", "lot division classification", "product kind code", "completed process number", "next process number", "date of process", "time of delivery from process", and the like. Further, in the second embodiment, assuming that every two boards are taken out, each board ID and the information indicative of "OK" or "NG" of the boards A and B have been stored.

A tracking control method for use in a manufacturing line in the second embodiment of the invention will now be described. In such a manufacturing processing line, processing devices are connected by a network. When a board is delivered by a board inserting station (corresponding to the station of a control unit, say unit 4-1) at the line head, that is, when the board is delivered to the next station (e.g., control unit 4-2) on the downstream side for processing, it is confirmed that the "transportable" signal from control unit 4-2 has been set. In this instance, the information, such as board ID and the like, stored in the ID tag 8 attached to the cassette 7 (namely, the individual board ID, board information, and the like) of every enclosing stage is read and stored into the common memory 204. After that, the board is delivered to control unit 4-2.

The control unit 4-2 on the downstream side reads out the tracking information about the relevant board from a specific area in the common memory 204 at the timing for transportation mentioned above, and fetches the read-out tracking information into a register (RAM) of the CPU of the control unit 4-2, to manage the tracking information. After completion of the process by control unit 4-2, the "transportable" signal from the control unit on the downstream side is examined. If "transportable", the processed board is delivered to the next station downstream. Prior to delivery of the board, the tracking information regarding the board is set into a predetermined area in the common memory 204. on the basis of the information on the ID tag 8 attached to the cassette 7, an interlock (i.e., regular procedures are performed and an operation is executed) and signal transmission and reception among the control units (stations) are executed by using the network 3.

When a defect is found in the inspecting step performed as part of the processing by each station, or if a defect is found upon processing, information relating to such defect is added to the tracking information by the relevant station and the resultant tracking information is tracked (i.e., the information is sent by adjusting timings) to the station on the downstream side. On the basis of such information, the quality of the board to be enclosed is selected (i.e., determined) in the enclosing station at the final stage of the line. The tracking information is written into the ID tag 8 attached to the enclosing cassette 7. Thus, even when the cassette 7 is transported to another line and is processed further, the tracking process can be continued by using the information of the ID tag 8 attached to the cassette 7. Thus, the tracking can be carried out over a plurality of lines.

Figure 17:
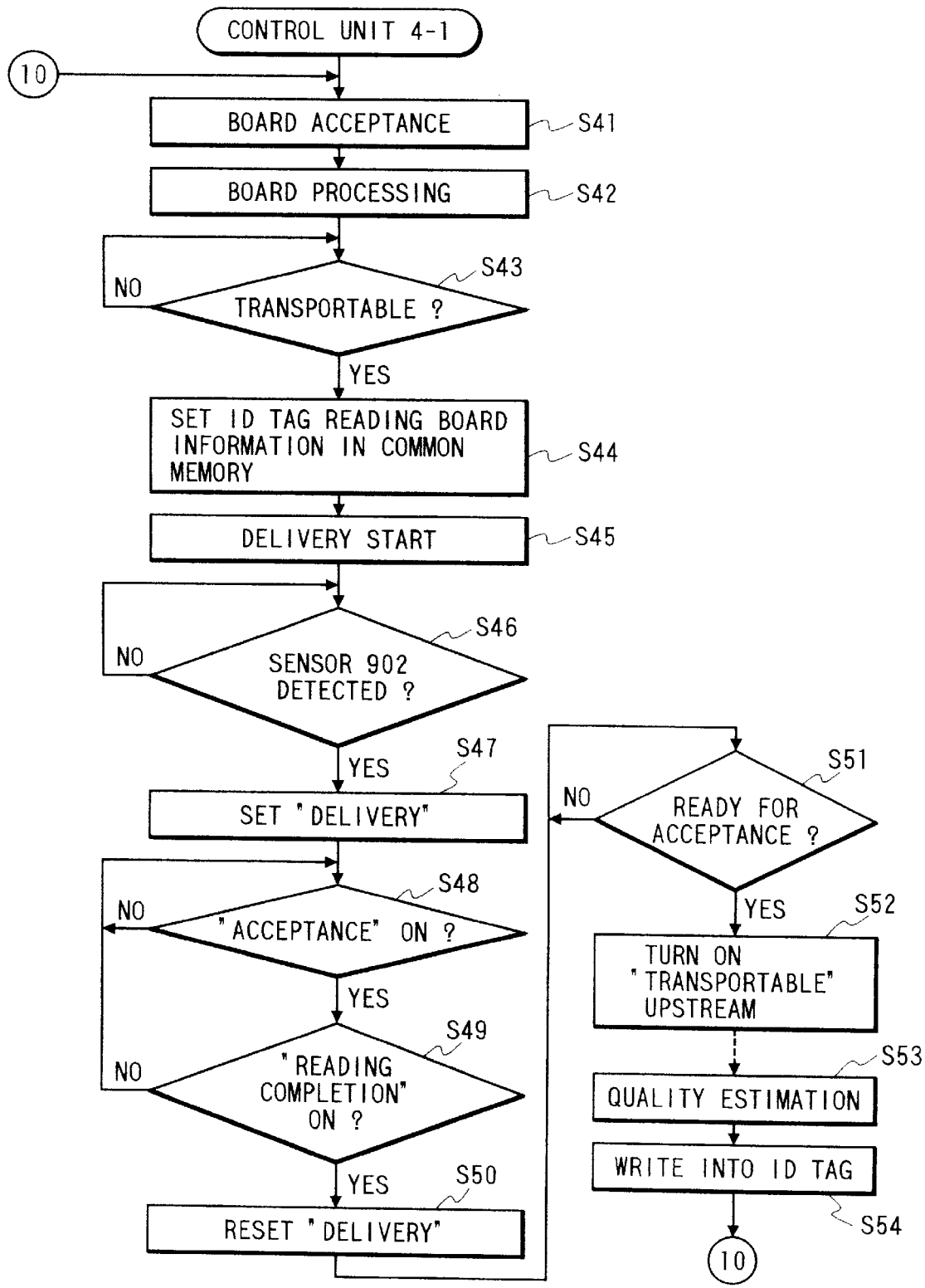
FIG. 17 is a flowchart showing processes in the control unit 4-1 according to the second embodiment.
Figure 18:
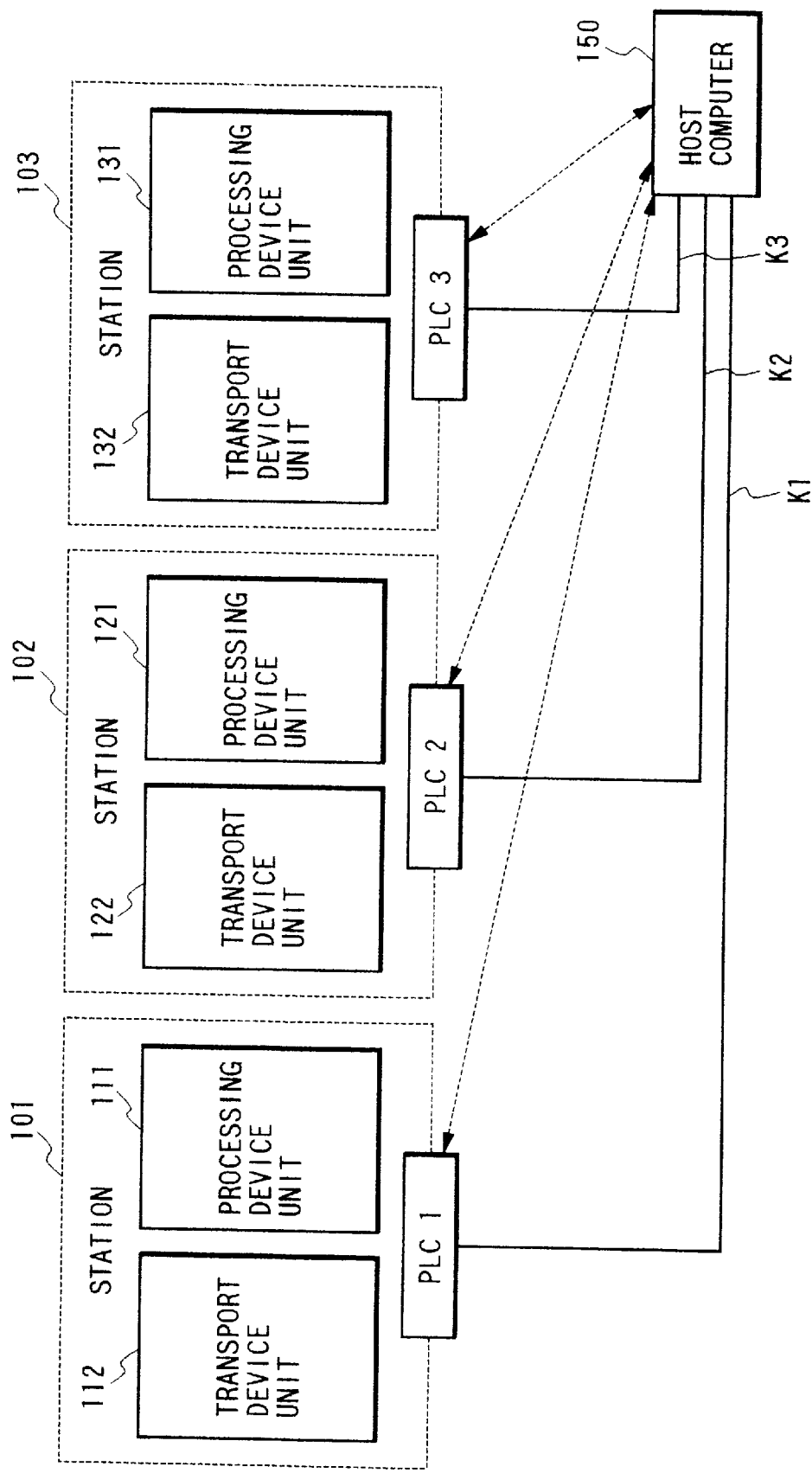
FIG. 18 is a schematic diagram showing a construction of a conventional manufacturing line system.

FIG. 17 is a flowchart showing processes in the control unit 4-1 according to the second embodiment of the invention.

The processes shown in the flowchart are largely similar to those in the flowchart of FIG. 12, except that in step S43, when the "transportable" signal of the control unit on the downstream side is received, the ID tag information attached to the cassette 7 is read and the board information is stored into a specific area in the common memory 204. The individual board ID of every enclosing stage of the cassette 7 and the board information are stored into specific addresses in the common memory 204.

Thus, in the control unit on the downstream side, the information stored in the common memory is read and the information regarding the board can be obtained. In steps S45 to S52, the processed board is delivered to the station on the downstream side as shown in steps S5 to S12 in FIG. 12. In step S53, when a board whose processing is complete, is transported to station 10-n (see FIG. 1), the board quality is discriminated with reference to the board information stored in a predetermined address in the common memory 204. On the basis of the discrimination result, the board information is written into the ID tag of the cassette in step S54. The processes in steps S53 and S54 described here are executed by control unit 4-n.

Thus, the cassette 7 is sent to another line and when the board is processed in this line, the board information in the preceding line can be referred to, so that the board can be transported and processed while tracking relevant information over a plurality of independent lines.

The embodiments described above provide the following effects.

(1) By being set in the host station, sampling data of different sampling times can be individually collected at every station. The sheet data of the board can also be collected synchronously with tracking of the board along the line.

(2) The procedures for the interlocking and signal transmission and reception among the stations in the line can be unified, and debugging and maintenance at the time of leading of the line (the initial setup and starting of the line) can be performed easily.

(3) The interlocking, signal transmission and reception, and transmission of board information among the stations can all be executed by one network, simplifying procedure.

(4) Since the tracking data can be managed synchronously with the transportation of the transporting board among the stations, no host computer for tracking control is necessary.

(5) As compared with a system using the conventional host computer, the time necessary to transfer the tracking data is short, and it is thus possible to cope with a short line-cycle time.

(6) Processing-instruction, selection, and enclosing of the boards can be performed by the addition and rewriting of the tracking information during the processing, and by utilizing this data.

The object of the invention is also accomplished by supplying a storing medium in which program codes of software to realize the functions of the foregoing embodiments have been recorded in a system or apparatus and by reading out and executing the program codes stored in the storing medium by means of a computer (or CPU or MPU) of the system or apparatus.

In this case, the program codes themselves read out from the storing medium realize the functions of the embodiments mentioned above, and the storing medium in which the program codes have been stored is an embodiment of the present invention.

As a storing medium to retain the program codes, for example, it is also possible to use any one of a floppy disk, a hard disk, an optical disk, a magnetooptic disk, a CD-ROM, a CD-R, a magnetic tape, a non-volatile memory card, a ROM, and the like.

Not only a case where the functions of the embodiments mentioned above are realized by executing the read-out program codes using a computer but also a case where an OS (operating system) or the like which is working on the computer executes a part or all of the actual processes on the basis of an instruction of the program codes, and the functions of the embodiments mentioned above are realized by these processes, are included in the scope of the invention.

Further, a case where, after the program codes read out from the storing medium and written into a memory equipped for a function expansion board inserted into the computer or a function expansion unit connected to the computer, a CPU or the like equipped for the function expansion board or function expansion unit executes a part or all of the actual processes on the basis of an instruction of the program codes and the functions of the embodiments mentioned above are realized by these processes, is also included within the scope of the invention.

According to the embodiments described above, synchronization among the control units connected to the processing devices can be established by using the common memories.

Using these embodiments, it is possible to share information regarding the work to be processed among a plurality of control units, and to process the work by synchronizing the processes among the processing devices, using a simple construction.

Many widely different embodiments of the present invention may be constructed without departing from the spirit and scope of the present invention. It should be understood that the present invention is not limited to the specific embodiments described in the specification, except as defined in the appended claims.

What is claimed is:

1. A line system having a network and having control units each of which is connected to a processing device for processing work and which are connected through said network, said system further comprising:

a respective memory for each of said control units, for storing data for use in processing the work by means of said processing device;

uniforming means for making contents in said memories coincide with each other; and transporting means for transporting said processed work from the processing device connected to a first one of control units to the processing device connected to a second one of control units, on the basis of data stored in a memory of said second control unit, wherein said first control unit stores information regarding said work that is being processed by the processing device connected to said first control unit, into a predetermined area in said memory of said first control unit, before the work is transported from that processing device, wherein said second control unit, which is located downstream of said first control unit, controls in a manner such that when the work is ready to be transported from the processing device of said first control unit to the processing device of said second control unit, such fact is stored into said memory of said second control unit; and wherein when the work transported from said first control unit is received, said second control unit reads out the data regarding the work from said memory of said second control unit.

2. A system according to claim 1, further comprising a line control unit, and wherein said uniforming means is associated with said line control unit to monitor an operation on a line, and said line control unit samples the contents in the respective memories provided for each of said control units at predetermined time intervals.

3. A system according to claim 1, further comprising rewriting means for periodically rewriting the contents in said memories.

4. A system according to claim 1, wherein memory addresses in said memories are allocated to different addresses for said first and second control units.

5. A system according to claim 1, wherein said first control unit stores data regarding the work into said memory of said first control unit before the work is transported from the processing device of said first control unit.

6. A system according to claim 1, wherein, after detection that said second control unit has written into its memory information indicating that the work is ready to be transported, said first control unit causes said transporting means to start to transport work from the processing device of said first control unit to the processing device of said second control unit.

7. A system according to claim 1, wherein the data regarding the work includes information about the quality of the work.

8. A system according to claim 1, wherein the data regarding the work includes information meeting the ISO9000 standard or the ISO14000 standard.

9. A system according to claim 1, wherein said memories use memory areas provided for different addresses in the memories of said first and second control units.

10. A line control apparatus for use in a line system having a network and having control units each of which is connected to a processing device for processing work and which are connected through said network, said line control apparatus comprising:

at least one memory storing data received from each control unit and used by said processing device connected to said control unit to process the work;

transmitting means for transmitting information to each control unit, wherein the information is composed of the data which was stored in said memory and which was received from the control units connected to at least those processing devices which are arranged immediately before and after a processing device processing the work; and transporting means for transporting said processed work from the processing device connected to a first one of control units to the processing device connected to a second one of control units, on the basis of data stored in a memory of said second control unit.

11. An apparatus according to claim 10, further comprising means for sampling contents in respective memories provided for each of said control units at predetermined time intervals.

12. A line control method for use in a line system having a network and having control units each of which is connected to a processing device for processing work and which are connected through said network, the method comprising the steps of:

storing data regarding the processing devices into a memory of the respective control units connected to said control units;

sampling contents in the memory for each control unit at predetermined time intervals; and transmitting information to each control unit, wherein the information is composed of the data from the memory of the control units connected to at least those processing devices which are arranged immediately before and after a device processing the work; and transporting said processed work from the processing device connected to a first one of control units to the processing device connected to a second one of control units, on the basis of said second control unit.

13. A method according to claim 12, further having the steps of:

processing the work by means of the processing device in a first one of the control units;

storing information regarding the work under processing into a memory of said first control unit when said first control unit confirms information which indicates that the work can be transported and which is derived from a second one of the control units located downstream from said first control unit;

transporting the work after completion of the process in said processing step from the processing device connected to said first control unit to the processing device connected to said second control unit;

reading out the information stored in said memory of said second control unit connected to said processing device to which the work was transported; and processing the work on the basis of the read-out information in the processing device connected to said second control unit.

14. A method according to claim 13, wherein said second control unit writes the information indicating that the work can be transported into the memory of said second control unit, and said first control unit reads out the information which indicates that the work can be transported and which is derived from said second control unit.

15. A method according to claim 13, wherein, after said second control unit has detected an acceptance of the work, said first control unit finishes delivering the work to said processing device of said second control unit.

16. A method according to claim 13, wherein the information regarding the work includes information about the quality of the work.

* * * * *

UNITED STATES PATENT AND TRADEMARK OFFICE
CERTIFICATE OF CORRECTION

PATENT NO. : 6,092,001

DATED : July 18, 2000

INVENTOR(S): YOSHIHIRO MIZUNO, ET AL.

It is certified that error appears in the above-identified patent and that said Letters Patent is hereby corrected as shown below:

<u>TITLE PAGE AT ITEM [56] RC</u>:
Foreign Patent Documents: "0 156 921 A1 3/1985 Euro. Pat. Off." should read --0 156 921 A1 10/1985 Euro. Pat. Off.--; and "0 620 512 A1 5/1994 Euro. Pat. Off." should read --0 620 512 A1 10/1994 Euro. Pat. Off.--.

Signed and Sealed this

Twenty-fourth Day of April, 2001

Attest:

NICHOLAS P. GODICI

*Attesting Officer*    *Acting Director of the United States Patent and Trademark Office*